(12) United States Patent
Ikuta et al.

(10) Patent No.: US 11,366,205 B2
(45) Date of Patent: Jun. 21, 2022

(54) OPTICAL SENSOR, DISTANCE MEASUREMENT DEVICE, AND ELECTRONIC APPARATUS

(71) Applicant: SHARP KABUSHIKI KAISHA, Sakai (JP)

(72) Inventors: Yoshiki Ikuta, Sakai (JP); Takuma Hiramatsu, Sakai (JP); Takayuki Shimizu, Sakai (JP); Hideki Sato, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 935 days.

(21) Appl. No.: 16/147,738

(22) Filed: Sep. 29, 2018

(65) Prior Publication Data

US 2019/0129012 A1     May 2, 2019

(30) Foreign Application Priority Data

Oct. 26, 2017    (JP) .............................. JP2017-207315

(51) Int. Cl.
    *G01S 7/4861*     (2020.01)
    *G01S 17/08*     (2006.01)
    *G01S 7/4865*     (2020.01)
    *G01S 17/14*     (2020.01)

(52) U.S. Cl.
    CPC .......... *G01S 7/4861* (2013.01); *G01S 7/4865* (2013.01); *G01S 17/08* (2013.01); *G01S 17/14* (2020.01)

(58) Field of Classification Search
    CPC ...... G01S 7/4861; G01S 7/4865; G01S 17/08; G01S 17/14; G01S 7/4863; G01S 13/865; G01S 17/26; G01S 17/86; G01S 17/894; G01S 17/931; G01S 7/4815; G01S 7/484; G01S 7/4876; G01S 7/524; G01S 7/527; G01S 7/53; G01S 17/003; G01S 17/48; G01S 17/88; G01S 7/486; H01L 31/107
See application file for complete search history.

(56) References Cited

U.S. PATENT DOCUMENTS

| | | | |
|---|---|---|---|
| 10,275,610 B2 * | 4/2019 | Yang ..................... | G01S 7/4861 |
| 10,962,628 B1 * | 3/2021 | Laifenfeld .............. | G01S 7/487 |
| 2014/0021356 A1 | 1/2014 | Zwaans et al. | |
| 2016/0033644 A1 | 2/2016 | Moore | |
| 2018/0123611 A1* | 5/2018 | Dutton .................. | G01S 7/4863 |
| 2018/0372849 A1* | 12/2018 | Kienzler .............. | G01S 7/4863 |

FOREIGN PATENT DOCUMENTS

| | | |
|---|---|---|
| JP | 2012-060012 A | 3/2012 |
| JP | 2014-514553 A | 6/2014 |
| JP | 2015-108629 A | 6/2015 |

OTHER PUBLICATIONS

C. Niclass, A. Rochas, P.-A. Besse and E. Charbon, "Design and characterization of a CMOS 3-D image sensor based on single photon Avalanche diodes," IEEE J. Solid-State Circ., 40 (2005), pp. 1,847-1,854.

* cited by examiner

*Primary Examiner* — Yuqing Xiao
*Assistant Examiner* — Amir J Askarian
(74) *Attorney, Agent, or Firm* — ScienBiziP, P.C.

(57) ABSTRACT

A selection circuit selects one of digital values respectively output from a TDC 1 and a TDC 2. A histogram generation circuit generates a histogram indicating a relationship between a bin number and a frequency by counting up the frequency of the bin number according to the digital value selected by the selection circuit.

7 Claims, 10 Drawing Sheets

OPTICAL SENSOR, DISTANCE MEASUREMENT DEVICE, AND ELECTRONIC APPARATUS

BACKGROUND

1. Field

The present disclosure relates to an optical sensor, a distance measurement device, and an electronic apparatus.

2. Description of the Related Art

In the related art, in optical communication or in measurement of a time of flight (TOF) and the like, an avalanche photodiode that employs an avalanche amplification (avalanche) effect of a photodiode is used as a light receiving element for detecting weak light at high speed (for example, see Japanese Unexamined Patent Application Publication No. 2012-060012). When a reverse bias voltage less than a breakdown voltage is applied, the avalanche photodiode operates in a linear mode, and an output current fluctuates so as to have a positive correlation with respect to received light amount. Meanwhile, when the reverse bias voltage equal to or greater than the breakdown voltage is applied, the avalanche photodiode operates in a Geiger mode. The avalanche photodiode in the Geiger mode causes an avalanche phenomenon even in a case of single photon incidence and therefore a large output current is obtained. Accordingly, the avalanche photodiode in the Geiger mode is referred to as a single-photon avalanche diode (SPAD).

A binary pulse output may be obtained by adding a quenching resistor in series to the avalanche photodiode in the Geiger mode. For example, such a circuit is configured with a photodiode, an active quenching resistor (resistance component of MOS transistor), and a buffer.

The above-described photodiode is the avalanche photodiode in the Geiger mode, and the avalanche phenomenon occurs with incidence of a single photon and a current flows when the bias voltage equal to or greater than the breakdown voltage is applied. When the current flows in the active quenching resistor connected in series to the photodiode, a voltage across terminals of the active quenching resistor increases, the bias voltage of the photodiode decreases, and the avalanche phenomenon stops. When the current due to the avalanche phenomenon disappears, the voltage across the terminals of the active quenching resistor decreases, and the bias voltage equal to or greater than the breakdown voltage is applied again to the photodiode. By using the buffer, a voltage change between the photodiode and the active quenching resistor is obtained as a binary pulse output.

C. Niclass, A. Rochas, P.-A. Besse and E. Charbon: "Design and characterization of a CMOS 3-D image sensor based on single photon Avalanche diodes," IEEE J. Solid-State Circ., 40 (2005), pp. 1,847-1,854 and Japanese Unexamined Patent Application Publication No. 2015-108629 disclose a method of measuring a distance by obtaining the maximum value of a histogram created by using the SPAD and a time-to-digital converter (TDC).

Recently, an increase in a frame rate is desired for autofocus functions of cameras and the like. However, in a TOF device using a time-to-digital converter, it is desired to provide a period for resetting the time-to-digital converter, and therefore photosensitivity that a light receiving element originally has may not be fully used. Accordingly, particularly, in measurement of a long distance, there is a possibility that a time to generate a histogram by the time-to-digital converter becomes long, and as a result, a frame rate may be low.

It is desirable to realize an optical sensor capable of measuring a distance at high speed.

SUMMARY

An optical sensor according to an aspect of the disclosure includes a light receiving unit that generates a pulse synchronous with incidence of a photon, two or more time-to-digital converters that generate a digital value based on the pulse during a valid period with a different phase, which is repeated at an identical cycle, a selection circuit that selects any one of the digital values respectively output from the two or more time-to-digital converters, and a histogram generation circuit that generates a histogram indicating a relationship between a bin number according to the digital value selected by the selection circuit and a frequency by counting up the frequency of the bin number.

DESCRIPTION OF THE EMBODIMENTS

Embodiment 1

Configuration of Optical Sensor 10

Figure 1:
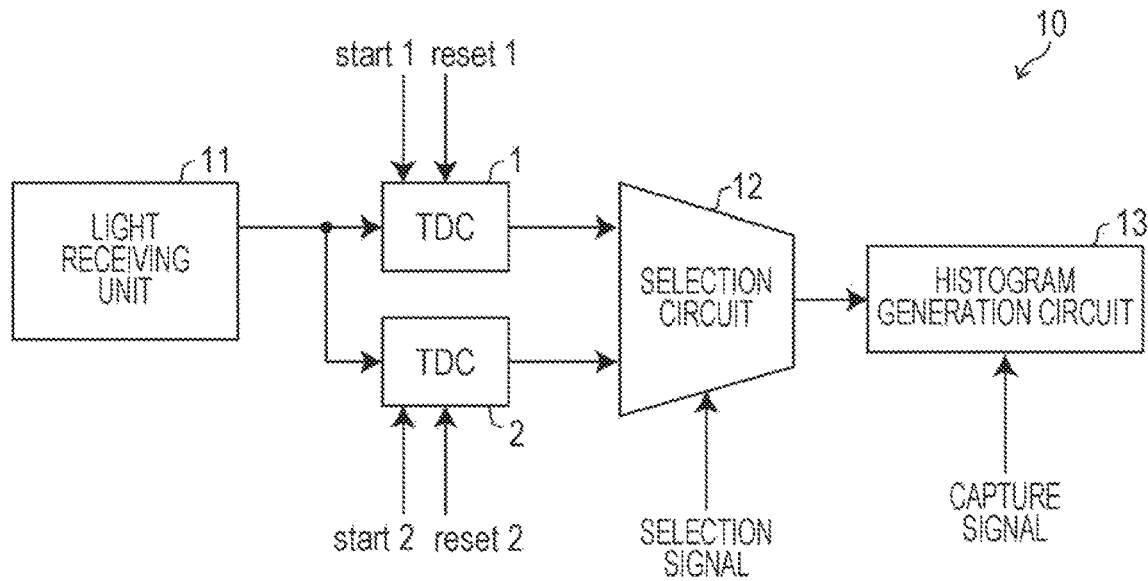
FIG. 1 is a diagram illustrating a block diagram of an optical sensor according to Embodiment 1.

FIG. 1 is a diagram illustrating a block diagram of an optical sensor 10 according to Embodiment 1. As illustrated in the drawing, the optical sensor 10 includes a light receiving unit 11, a time-to-digital converter (TDC) 1, a time-to-digital converter (TDC) 2, a selection circuit 12, and a histogram generation circuit 13.

The light receiving unit 11 is a photon counting light receiving unit 11. Specifically, the light receiving unit 11 generates pulses synchronous with the incidence of photons to the light receiving unit, and outputs the pulses to the TDC 1 and the TDC 2.

The TDC 1 and the TDC 2 generate digital values based on an input pulse. The digital value has a certain bit width. In the TDC 1 and the TDC 2, a valid period and an invalid period of different phases repeated at the same cycle are set. More specifically, lengths of the valid period and the invalid period of the TDC 1 and lengths of the valid period and the invalid period of the TDC 2 are all the same. The valid period of the TDC 1 and the invalid period of the TDC 2 are synchronous with each other, and the invalid period of the TDC 1 and the valid period of the TDC 2 are synchronous with each other.

The valid period of the TDC 1 is a period in which the digital value of the TDC 1 falls within a bin number range of a histogram generated by the histogram generation circuit 13. The invalid period of the TDC 1 is a period in which the digital value of the TDC 1 does not fall within the bin number range of the histogram. The valid period of the TDC 2 is a period in which the digital value of the TDC 2 falls within the bin number range of the histogram. The invalid period of the TDC 2 is a period in which the digital value of the TDC 2 does not fall within the bin number range of the histogram.

A start 1 and a reset 1 are input to the TDC 1. A start 2 and a reset 2 are input to the TDC 2.

The selection circuit 12 selects one of the digital values respectively output from the TDC 1 and the TDC 2. A selection signal is input to the selection circuit 12. The selection signal is a signal for designating one of output selection of the TDC 1 or output selection of the TDC 2. During the valid period of the TDC 1, the selection signal designates the output selection of the TDC 2. During the valid period of the TDC 2, the selection signal designates the output selection of the TDC 1.

The histogram generation circuit 13 counts up the frequency of the bin number corresponding to the digital value selected by the selection circuit 12 so as to generate the histogram indicating the relationship between the bin number and the frequency. A capture signal is input to the histogram generation circuit 13. The capture signal is a signal for designating timing of capturing the digital value for the histogram generation circuit 13. The histogram generation circuit 13 causes the digital value selected by the selection circuit 12 to be captured from the selection circuit 12 to the histogram generation circuit 13 at timing in which the capture signal rises.

Configuration of Light Receiving Unit 11

Figure 2:
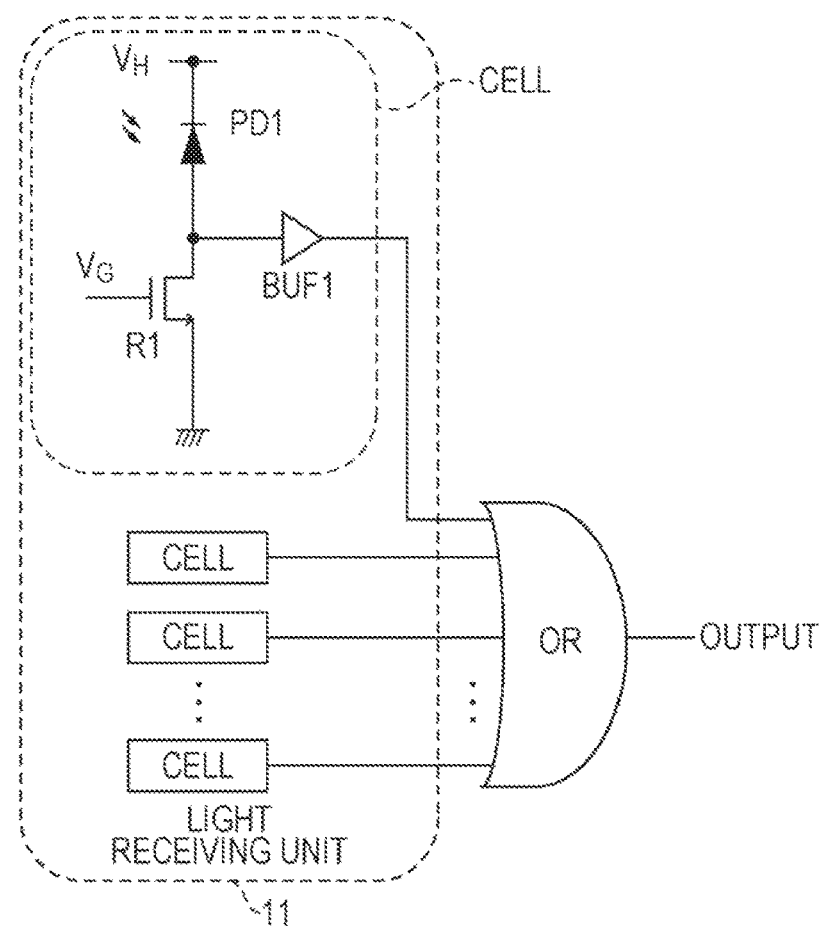
FIG. 2 is a diagram illustrating a configuration of a light receiving unit.

FIG. 2 is a diagram illustrating a configuration of the light receiving unit 11. As illustrated in the drawing, the light receiving unit 11 includes a plurality of CELLs configured with a photodiode PD1, an active quenching resistor R1 (resistance component of MOS transistor), and a buffer BUF1. The photodiode PD1 is the avalanche photodiode in the Geiger mode, and the amount of incident light is obtained as a binary pulse output by the active quenching resistor R1 and the buffer BUF1. The output of each CELL is generated by performing OR calculation at an OR circuit, and output to the TDC 1 and the TDC 2. The light receiving unit 11 illustrated in FIG. 2 may be stably operated by controlling a pulse width to be fixed. It is desirable that a single photon avalanche diode (SPAD) may be applied to the PD1.

Timing Chart

Figure 3:
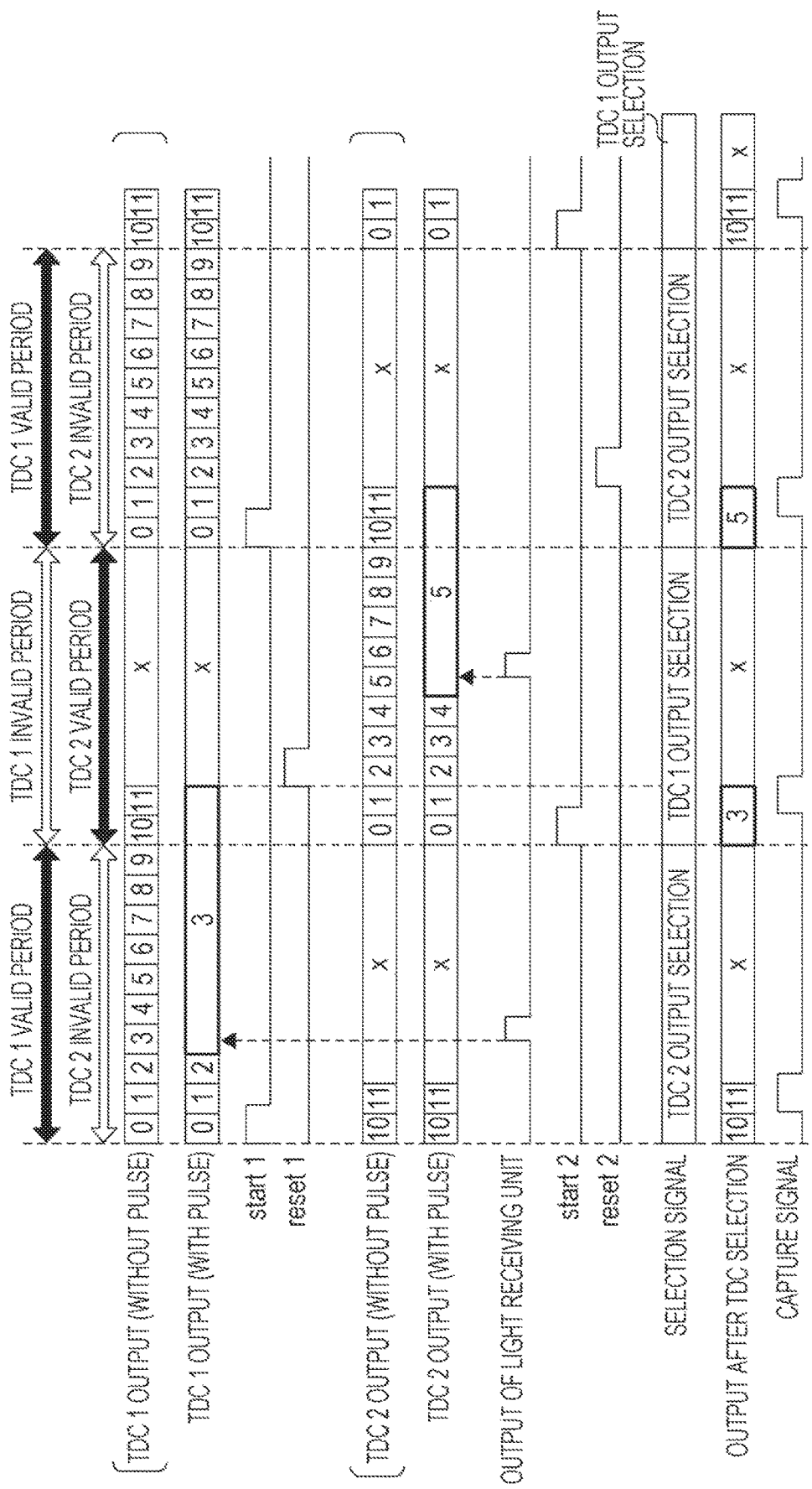
FIG. 3 is an example of a timing chart when the optical sensor according to Embodiment 1 is operated.

FIG. 3 is an example of a timing chart when the optical sensor 10 according to Embodiment 1 is operated. In FIG. 3, the TDC 1 and the TDC 2 are operated in a state of having the same period with a phase shifted by half the period. One period in which the TDC 1 or the TDC 2 is operated corresponds to a period including one valid period and one invalid period being summed.

A valid range of the digital value generated by the TDC 1 or the TDC 2 is set to zero to nine. Therefore, a bin width of the digital value may be the minimum bit width "four" where the digital value may be obtained from any value from zero to nine. The valid period of the TDC 1 and the TDC 2 is set to a time corresponding to the valid range of the digital value of the TDC 1 and the TDC 2. In other words, the length of the valid period is set to a length ten times based on the length corresponding to one bit of the digital value as one unit.

The histogram generation circuit 13 includes ten bins corresponding to the valid range of "zero to nine" of the digital values. In each bin, any bin number included in the bin number range of "zero to nine" corresponding to the valid range of "zero to nine" of the digital values is assigned. Hereinafter, the bins on which the bin numbers "zero" to "nine" are assigned, are referred to as the zeroth bin to the ninth bin, respectively. Corresponding frequencies are stored in the zeroth bin to the ninth bin.

The TDC 1 starts counting up of the digital value at the rising of the start 1. The TDC 1 stops the counting up of the digital value when a pulse is input to the TDC 1 within the valid period of the TDC 1 and holds the digital value outside the valid period of the TDC 1. Furthermore, the TDC 1 resets the digital value at the rising of the reset 1. In FIG. 3, the digital value of the TDC 1 is illustrated as X at the time of reset.

The TDC 2 starts counting up of the digital value at the rising of the start 2. The TDC 2 stops the counting up of the digital value when a pulse is input to the TDC 2 within the valid period of the TDC 2 and holds the digital value outside the valid period of the TDC 2. Furthermore, the TDC 2 resets the digital value at the rising of the reset 2. In FIG. 3, the digital value of the TDC 2 is illustrated as X at the time of reset.

Operation of TDC 1

In FIG. 3, the start 1 rises at a time in which the valid period of the TDC 1 starts. With this, the TDC 1 starts the counting up of the digital value. The rising of the start 1 may occur at any time within the valid period of the TDC 1. The digital value immediately after starting the counting up is "zero". The TDC 1 increases the digital value by one every time a certain period of time elapses after the starting of counting up. Within the valid period of the TDC 1, the first pulse output from the light receiving unit 11 is input to the TDC 1. At this time, the digital value of the TDC 1 is counted up to "three". The TDC 1 stops the counting up of the digital value based on the input of the pulse. The TDC 1 holds the digital value "three" until the next invalid period of the TDC 1.

The invalid period of the TDC 1 starts and the selection signal for designating the output selection of the TDC 1 is input to the selection circuit 12. The selection circuit 12 selects the output of the TDC 1 and instructs the TDC 1 to output the digital value, based on the input of the selection signal. The TDC 1 outputs the digital value "three" to the selection circuit 12, based on the instruction from the selection circuit 12, after stopping the counting up of the digital value. The selection circuit 12 holds the input digital value "three".

When a certain period of time elapses after starting the invalid period of the TDC 1, the capture signal rises. The histogram generation circuit 13 instructs the selection circuit 12 to output the digital value, based on the rising of the capture signal. The selection circuit 12 outputs the digital value "three" being currently held to the histogram generation circuit 13 based on this instruction. The histogram generation circuit 13 specifies "three" as the bin number corresponding to the input digital value "three". The histogram generation circuit 13 counts up the frequency held in the third bin corresponding to the specified bin number "three". In other words, the frequency held in the third bin increases by one.

During the invalid period of the TDC 1, after the digital value "three" is output from the TDC 1 to the selection circuit 12, the reset 1 rises. With this, the TDC 1 resets the digital value "three". Then, the digital value of the TDC 1 is maintained at an indefinite value.

Operation of TDC 2

In FIG. 3, at a time in which the valid period of the TDC 2 starts, the start 2 rises. With this, the TDC 2 starts the counting up of the digital value. The rising of the start 2 may occur at any time within the valid period of the TDC 2. The digital value immediately after the counting up is "zero". The TDC 2 increases the digital value by one every time a certain time elapses after starting of the counting up. Within the valid period of the TDC 2, the second pulse output from the light receiving unit 11 is input to the TDC 2. At this time, the digital value of the TDC 2 is counted up until "five". The TDC 2 stops the counting up of the digital value based on the input of the pulse. The TDC 2 holds the digital value "five" until the next invalid period of the TDC 2.

The invalid period of the TDC 2 starts and the selection signal for designating the output selection of the TDC 2 is input to the selection circuit 12. The selection circuit 12 selects the output of the TDC 2 and instructs the TDC 2 to output the digital value, based on the input of the selection signal. The TDC 2 outputs the digital value "five" to the selection circuit 12, based on the instruction by the selection circuit 12, after stopping the counting up of the digital value. The selection circuit 12 holds the input digital value "five".

When a certain period of time elapses after starting the invalid period of the TDC 2, the capture signal rises. The histogram generation circuit 13 instructs the selection circuit 12 to output the digital value, based on the rising of the capture signal. The selection circuit 12 outputs the digital value "five" being currently held to the histogram generation circuit 13 based on this instruction. The histogram generation circuit 13 specifies "five" as the bin number corresponding to the input digital value "five". Accordingly, the histogram generation circuit 13 counts up the frequency held in the fifth bin corresponding to the specified bin number "five". In other words, the frequency held in the fifth bin increases by one.

In the invalid period of the TDC 2, after outputting the digital value "five" from the TDC 2 to the selection circuit 12, the reset 2 rises. With this, the TDC 2 resets the digital value "five". Then, the digital value of the TDC 1 is maintained at an indefinite value.

In FIG. 3, a case where the digital value of the TDC 1 or the TDC 2 is 10 or 11 at the rising of the capture signal, is illustrated. Since the valid range of the digital value of the TDC 1 and the TDC 2 is zero to nine, the histogram generation circuit 13 does not count up the frequency in a case where the digital value of the TDC or the TDC 2 is "10" or "11".

The optical sensor 10 repeats operations illustrated in FIG. 3 during each valid period and each invalid period such that it is possible to generate the histogram according to light receiving timing in the light receiving unit 11. As the light receiving timing in the light receiving unit 11 is earlier, the frequency held in the bin with the smaller bin number is counted up. Conversely, as the light receiving timing in the light receiving unit 11 is later, the frequency held in the bin with the larger bin number is counted up.

Comparative Example

Figure 4:
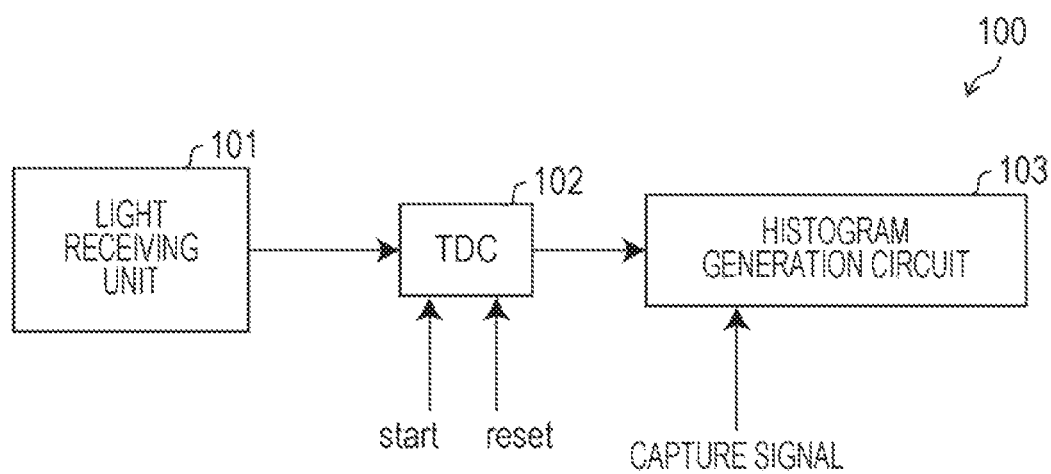
FIG. 4 is a block diagram illustrating a configuration of an optical sensor according to a comparative example.

FIG. 4 is a block diagram illustrating a configuration of an optical sensor 100 according to a comparative example. The optical sensor 100 of FIG. 4 includes a light receiving unit 101, a TDC 102, and a histogram generation circuit 103. The configuration and operations are the same as those of the light receiving unit 11, the TDC 1, and the histogram generation circuit 13 described above.

Figure 5:
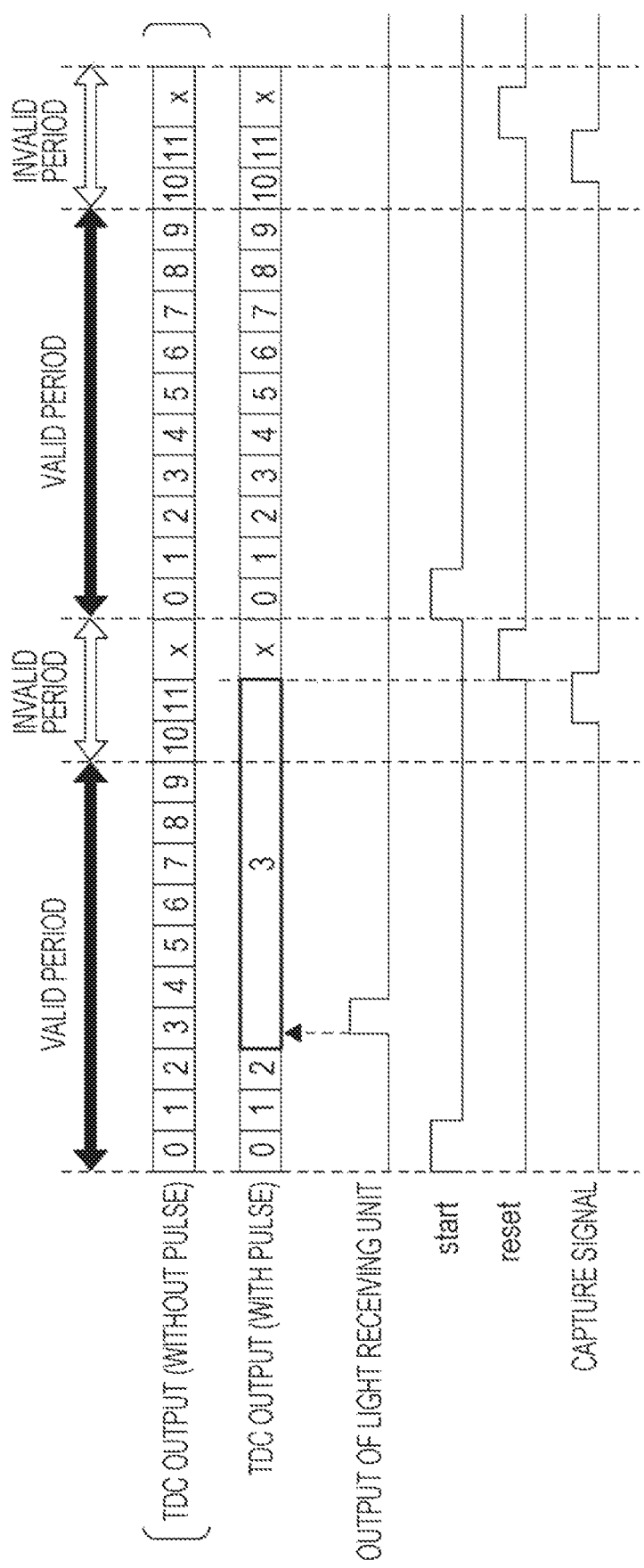
FIG. 5 is an example of a timing chart when the optical sensor according to the comparative example is operated.

FIG. 5 is an example of a timing chart when the optical sensor 100 according to the comparative example is operated. An operation of the TDC 102 is the same as that of the TDC 1 included in the optical sensor 10 according to Embodiment 1. In FIG. 5, the invalid period of the TDC 102 is shorter than the valid period of the TDC 102. Since the optical sensor 100 according to the comparative example includes a single TDC 102, it is desired to set both the rising timing of the capture signal and the rising timing of reset within the invalid period of the TDC 102. With this, since the invalid period directly becomes a dead time, an optical sensor may not detect an object to be measured when a distance from a distance measurement device to the object to be measured is equal to or greater than a certain value, in a case where the optical sensor 100 is used for the time of flight (TOF) measurement in particular.

Figure 6:
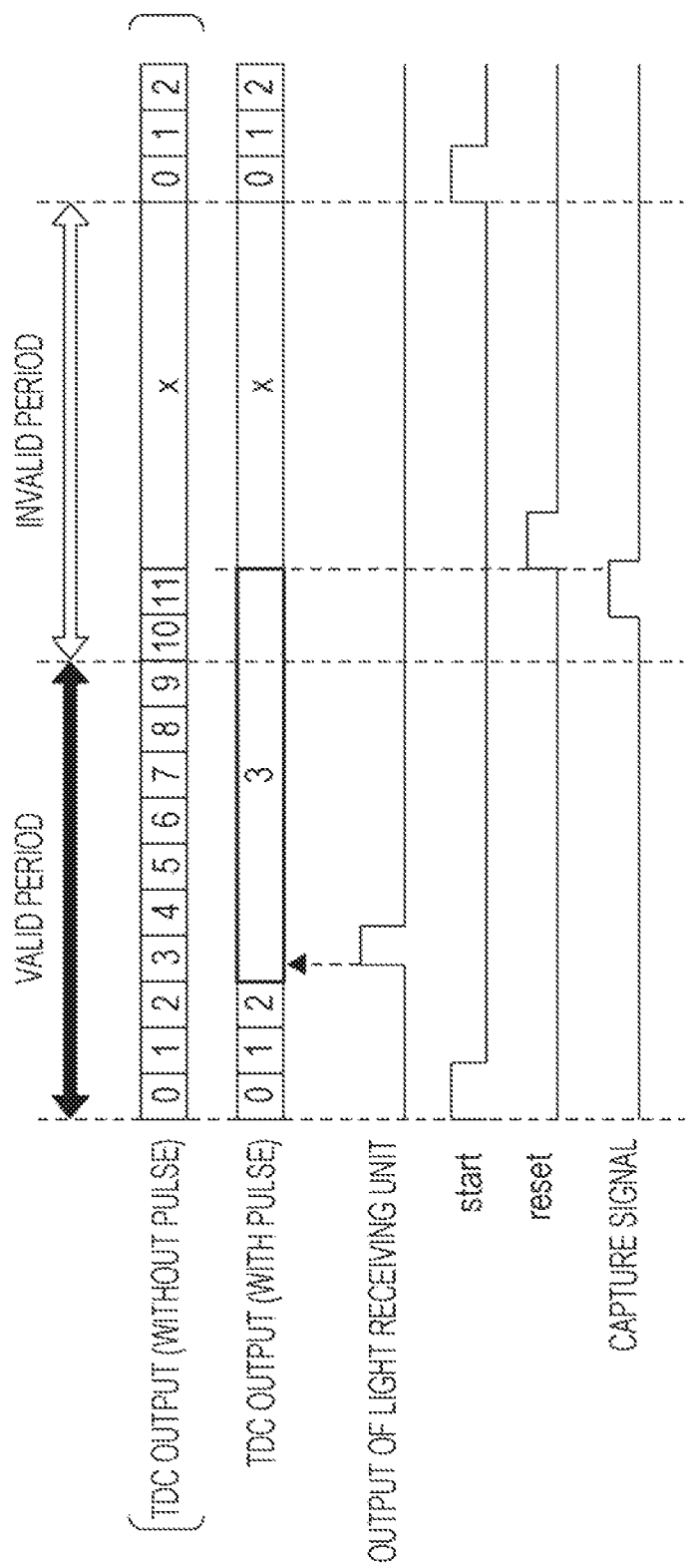
FIG. 6 is another example of the timing chart when the optical sensor according to the comparative example is operated.

FIG. 6 is another example of the timing chart when the optical sensor according to the comparative example is operated. In FIG. 6, the invalid period of the TDC 102 is the same as the valid period of the TDC 102 or is set to a multiple of the valid period of the TDC 102. With this, since a period of the valid period of the TDC 102 may be kept to be a period corresponding to the valid range of "zero to nine" of the digital value output from the TDC 102, no dead time occurs. However, the invalid period of the TDC 102 becomes longer and thus the photosensitivity decreases to less than half. As a result, in the optical sensor 100 according to the comparative example, there arises a problem that a time requested for the distance measurement using the optical sensor 100 is doubled or more, as compared with the optical sensor 10 according to Embodiment 1.

In the optical sensor 10 according to the present embodiment, the valid period of the TDC 2 is arranged at each time after the valid period of the TDC 1, and the valid period of the TDC 1 is arranged at each time after the valid period of the TDC 2. Accordingly, the optical sensor 10 of the present embodiment has no dead time unlike the optical sensor 100 in the related art and has higher photosensitivity than the optical sensor 100 in the related art. Therefore, the distance measurement device including the optical sensor 10 according to the present embodiment may measure the distance faster as compared with the distance measurement device including the optical sensor 100 in the related art.

Embodiment 2

Figure 7:
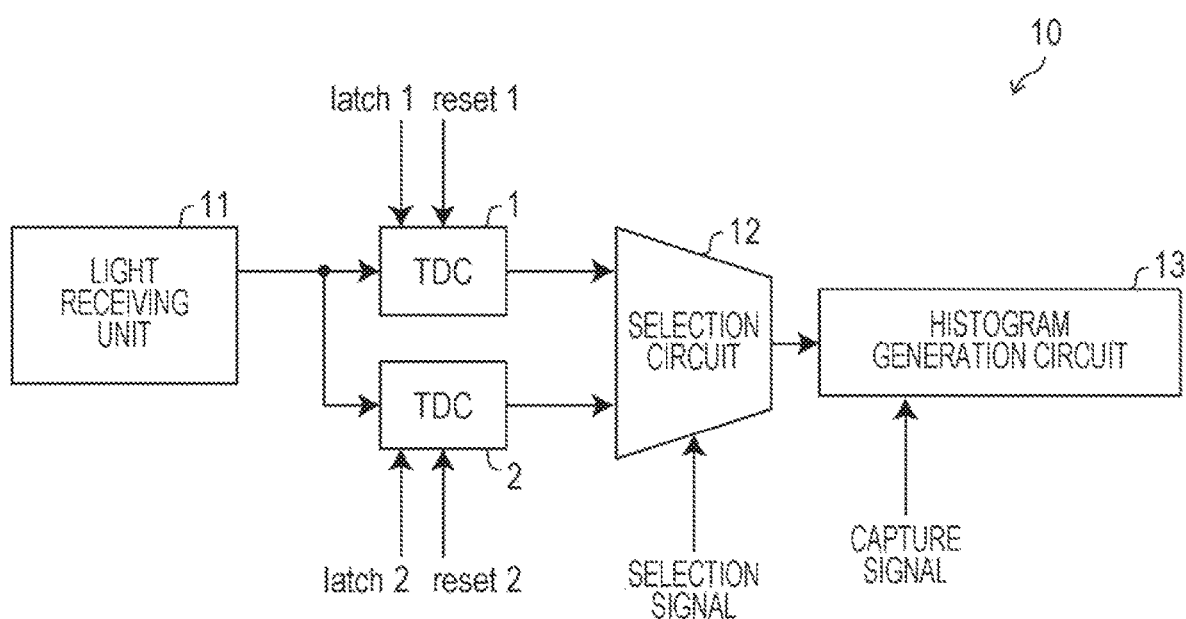
FIG. 7 is a block diagram illustrating a configuration of an optical sensor according to Embodiment 2.

FIG. 7 is a block diagram illustrating a configuration of an optical sensor 10 according to Embodiment 2. A configuration of the optical sensor 10 according to the present embodiment is the same as that of the optical sensor 10 according to Embodiment 1. However, in the present embodiment, a latch 1 instead of the start 1 is input to the TDC 1 and a latch 2 instead of the start 2 is input to the TDC 2.

Timing Chart

Figure 8:
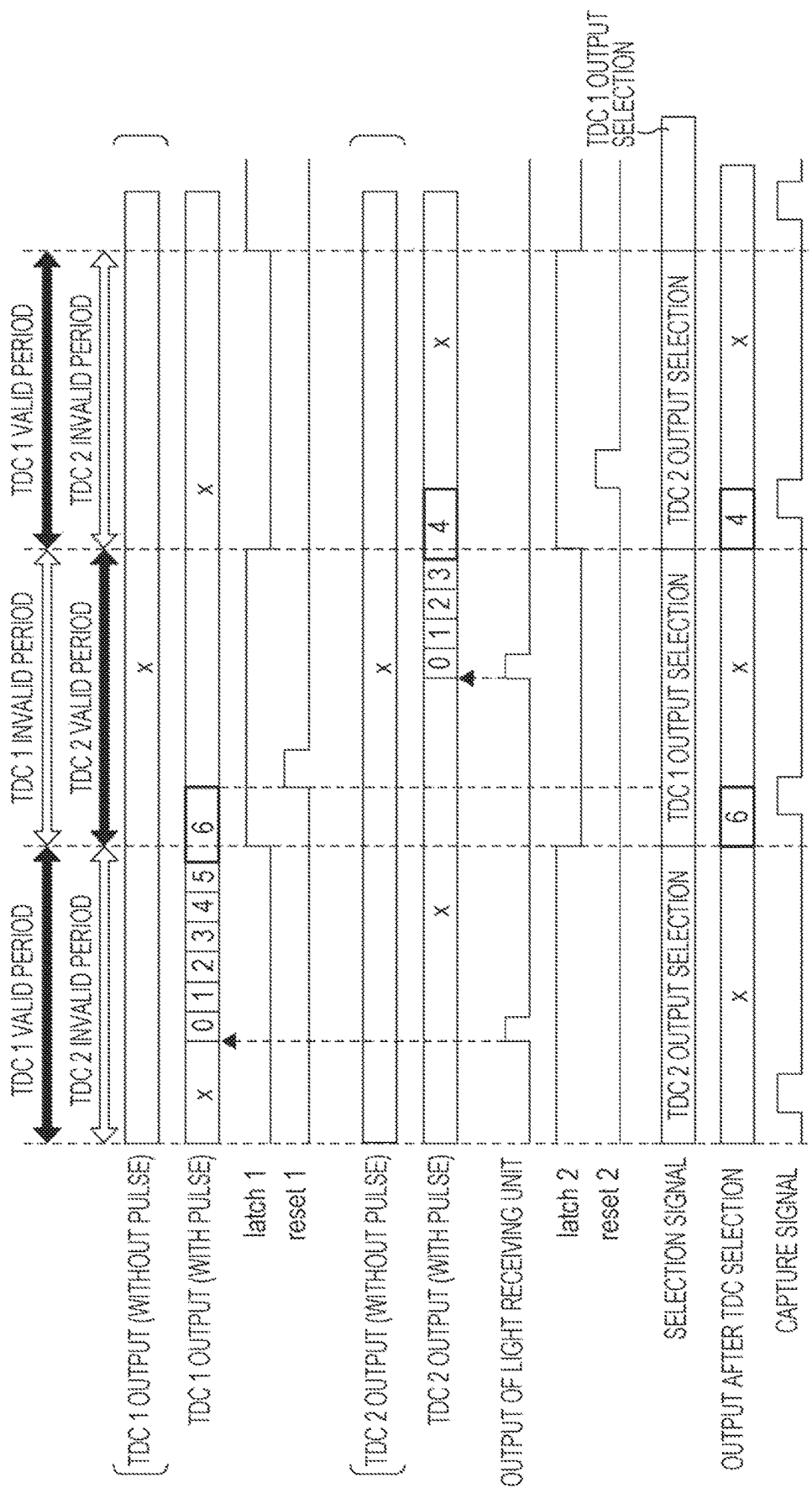
FIG. 8 is an example of a timing chart when the optical sensor according to Embodiment 2 is operated.

FIG. 8 is an example of a timing chart in which the optical sensor 10 according to Embodiment 2 is operated. In the present embodiment, the TDC 1 and the TDC 2 are operated in a state where a phase is shifted by half a cycle with the same cycle similarly to Embodiment 1. The valid range of the digital value generated by the TDC 1 or the TDC 2 is "zero to nine". The valid period of the TDC 1 and the TDC 2 is set to a time corresponding to the valid range of "zero to nine" of the digital values of the TDC 1 and the TDC 2.

In a case where a pulse is input from the light receiving unit 11 within the valid period of the TDC 1, the TDC 1 starts the counting up of the digital value. The TDC 1 stops the counting up of the digital value at the rising of the latch 1 within the invalid period of the TDC 1. Furthermore, the TDC 1 resets the digital value at the rising of the reset 1. In FIG. 8, the digital value of the TDC 1 at the time of reset is illustrated as X.

In a case where a pulse is input from the light receiving unit 11 within the valid period of the TDC 2, the TDC 2 starts the counting up of the digital value. The TDC 2 stops the counting up of the digital value at the rising of latch 2 within the invalid period of the TDC 2. Furthermore, the TDC 2 resets the digital value at the rising of the reset 2. In FIG. 8, the digital value of the TDC 2 at the time of reset is illustrated as X.

Digital Value of TDC 1

In FIG. 8, at a certain time within the valid period of the TDC 1, the first pulse output from the light receiving unit 11 is input to the TDC 1. With this, the TDC 1 starts the counting up of the digital value. The digital value immediately after the counting up is "zero". The TDC 1 increases the digital value by one every time a certain time elapses after starting the counting up. At a time in which the invalid period of the TDC 1, the latch 1 rises. At this time, the digital value of the TDC 1 is counted up until "six". The TDC 1 stops the counting up of the digital value based on the rising of latch 1, and holds the digital value "six".

The invalid period of the TDC 1 starts and the selection signal for designating the output selection of the TDC 1 is input to the selection circuit 12. The selection circuit 12 selects the outputting of the TDC 1 and instructs the TDC 1 to output the digital value, based on the input of the selection signal. The TDC 1 outputs the digital value "six" to the selection circuit 12 based on the instruction by the selection circuit 12. The selection circuit 12 holds the input digital value "six".

When a certain period of time elapses after starting the invalid period of the TDC 1, the capture signal rises. The histogram generation circuit 13 instructs the selection circuit 12 to output the digital value, based on the rising of the capture signal. The selection circuit 12 outputs the digital value "six" being currently held to the histogram generation circuit 13 based on this instruction. The histogram generation circuit 13 specifies "six" as the bin number corresponding to the input digital value "six". The histogram generation circuit 13 counts up the frequency held in the sixth bin corresponding to the specified bin number "six".

In the invalid period of the TDC 1, after the digital value "six" is output from the TDC 1 to the selection circuit 12, a reset 1 rises. With this, the TDC 1 resets the digital value "six" after outputting of the digital value "six". Then, the digital value of the TDC 1 is maintained to an indefinite value.

Digital Value of TDC 2

In FIG. 8, at a certain time within the valid period of the TDC 2, the second pulse output from the light receiving unit 11 is input to the TDC 2. With this, the TDC 2 starts the counting up of the digital value. The digital value immediately after starting the counting up is "zero". The TDC 2 increases the digital value by one every time a certain time elapses after starting the counting up. At a time in which the invalid period of the TDC 2, the latch 2 rises. At this time, the digital value of the TDC 2 is counted up until "four". The TDC 2 stops the counting up of the digital value based on the rising of latch 2, and holds the digital value "four".

The invalid period of the TDC 2 starts and the selection signal for designating the output selection of the TDC 2 is input to the selection circuit 12. The selection circuit 12 selects the outputting of the TDC 2 and instructs the TDC 2 to output the digital value, based on the inputting of the selection signal. The TDC 2 outputs the digital value "four" to the selection circuit 12 based on the instruction by the selection circuit 12. The selection circuit 12 holds the input digital value "four".

When a certain period of time elapses after starting the invalid period of the TDC 2, the capture signal rises. The histogram generation circuit 13 instructs the selection circuit 12 to output the digital value, based on the rising of the capture signal. The selection circuit 12 outputs the digital value "four" being currently held to the histogram generation circuit 13 based on this instruction. The histogram generation circuit 13 specifies "four" as the bin number corresponding to the input digital value "four". The histogram generation circuit 13 counts up the frequency held in the fourth bin corresponding to the specified bin number "four".

In the invalid period of the TDC 2, after the digital value "four" is output from the TDC 1 to the selection circuit 12, the reset 2 rises. With this, the TDC 2 resets the digital value "four" after outputting of the digital value "four". Then, the digital value of the TDC 1 is maintained to an indefinite value.

The optical sensor 10 repeats operations illustrated in FIG. 8 during each valid period and each invalid period such that it is possible to generate the histogram according to the light receiving timing in the light receiving unit 11. As the light receiving timing in the light receiving unit 11 is earlier, the frequency held in the bin with the smaller bin number is counted up. Conversely, as the light receiving timing in the light receiving unit 11 is later, the frequency held in the bin with the larger bin number is counted up.

The optical sensor 10 according to the present embodiment has the same effect as the optical sensor 10 according to Embodiment 1. Furthermore, in the present embodiment, the TDC 1 and the TDC 2 count up the digital value only in a case where the pulse is input. In other words, the TDC 1 and the TDC 2 do not count up the digital value in a case where the pulse is not input. With this, in the present embodiment, the current consumption for the operation of the TDC 1 and the TDC 2 may be suppressed as compared with those in Embodiment 1.

Embodiment 3

Figure 9:
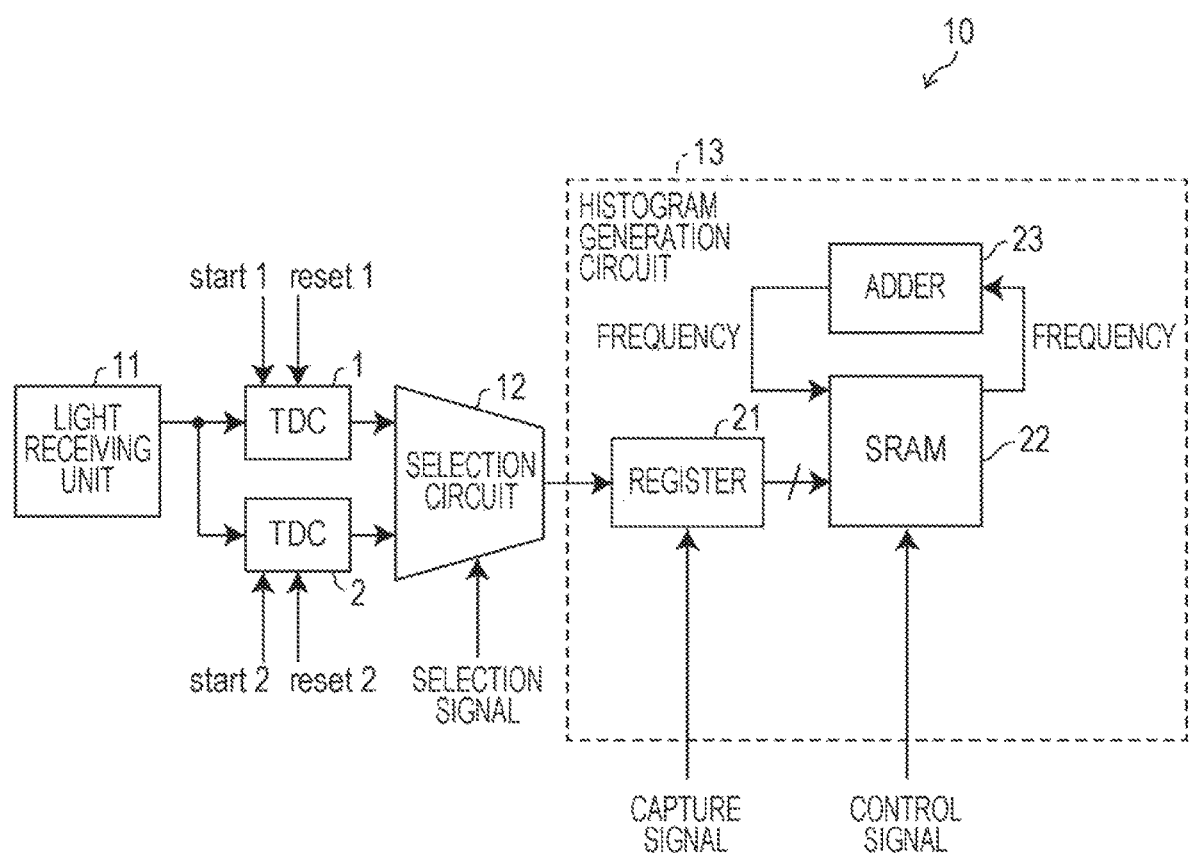
FIG. 9 is a block diagram illustrating a configuration of a histogram generation circuit included in an optical sensor according to Embodiment 3.

FIG. 9 is a block diagram illustrating a configuration of a histogram generation circuit 13 included in an optical sensor 10 according to Embodiment 3. Embodiment 3 embodies an internal configuration of the histogram generation circuit 13 according to Embodiment 1. As illustrated in FIG. 9, the histogram generation circuit 13 includes a register 21, an SRAM (memory device) 22, and an adder 23.

The register 21 has the same bit width as the bit width of the digital value of the TDC 1. The SRAM 22 has the address having the same bit width as the bit width of the register 21. Specifically, the SRAM 22 has ten addresses (zero to nine). The frequency of a corresponding bin number is held in each address. For example, the frequency of a corresponding bin number "three" is held in the address "three". The adder 23 increases the frequency of any one of values held in the SRAM 22 by one. A data output unit of the SRAM 22 is connected to a data input unit of the adder 23 and the data output unit of the adder 23 is connected to the data input unit of the SRAM 22.

Figure 10:
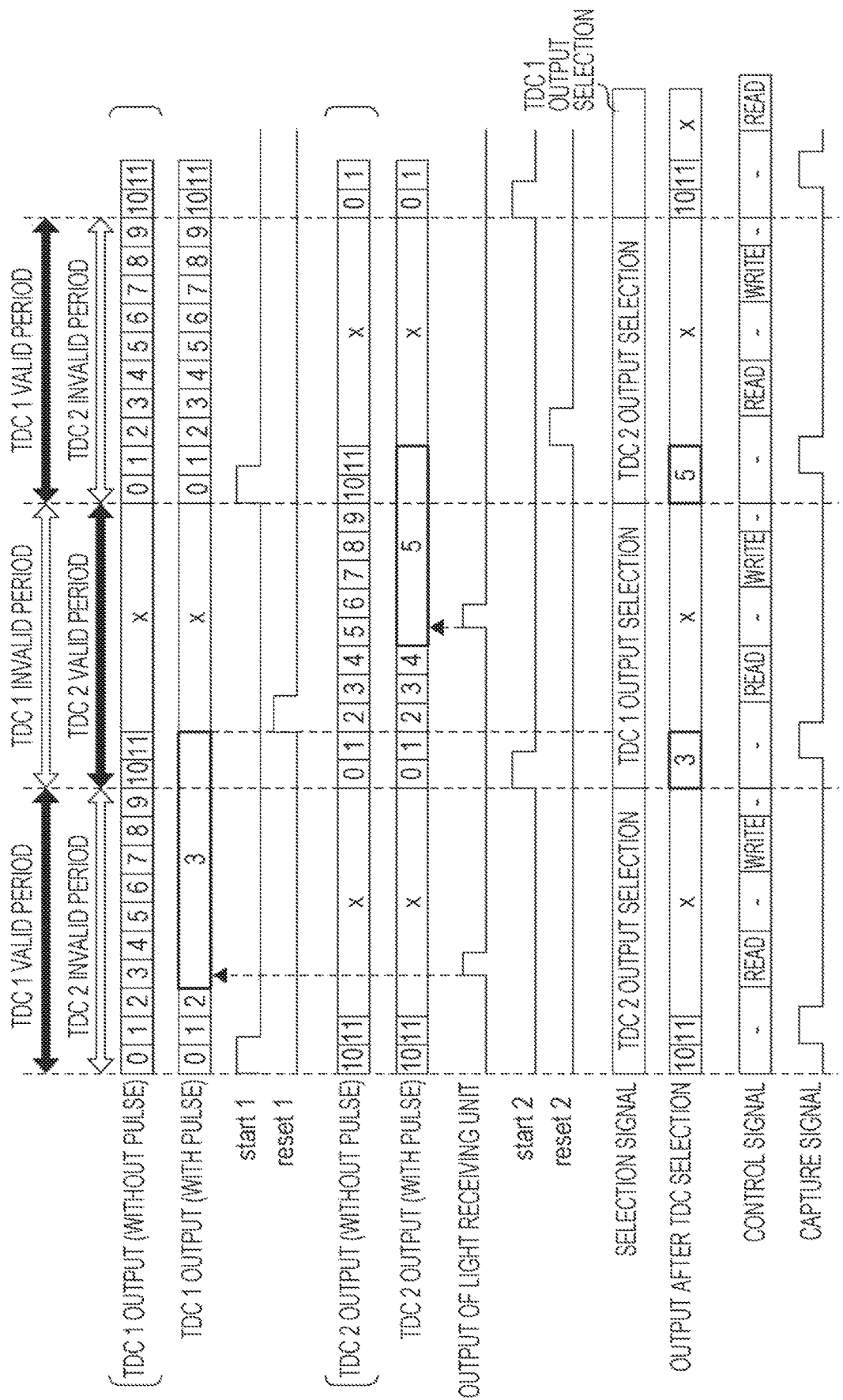
FIG. 10 is an example of a timing chart when the optical sensor according to Embodiment 3 is operated.

FIG. 10 is an example of a timing chart when the optical sensor 10 according to Embodiment 3 is operated. When a pulse is output from the light receiving unit 11 to the TDC 1 within the valid period of the TDC 1, the TDC 1 holds the digital value "three" according to the pulse. When the capture signal rises within the invalid period of the TDC 1, the selection circuit 12 outputs the digital value "three" of the TDC 1 to the histogram generation circuit 13. The histogram generation circuit 13 holds the input digital value "three" in the register 21.

Within the invalid period of the TDC 1, a control signal "READ" is input to the histogram generation circuit 13. With this, the histogram generation circuit 13 specifies the address "three" of the SRAM 22 that is the same address as the digital value "three" held in the register 21. Furthermore, the histogram generation circuit 13 outputs the frequency of the bin number 3 stored in the address "three" to the adder 23.

The adder 23 increases the input frequency by one. The frequency after the increase is input to the data input unit of the SRAM 22. Subsequently, within the invalid period of the TDC 1, a control signal "WRITE" is input to the histogram generation circuit 13. With this, the histogram generation circuit 13 newly stores the frequency after the addition which is input from the adder 23 to the SRAM 22, in the specified address "three". Thus, the counting up of the frequency stored in the address "three" is reliably performed.

During the valid period and the invalid period of the TDC 2, also the optical sensor 10 operates similarly to the above-described operation. The optical sensor 10 repeats the above-described operation during each of the valid period and the invalid period of the TDC 1 and during each of the valid period and the invalid period of the TDC 2, and thus it is possible to generate the histogram according to the light receiving timing.

In Embodiment 3, the histogram generation circuit 13 includes the SRAM 22 and therefore it is possible to reduce a size of the optical sensor 10. Furthermore, the histogram generation circuit 13 may perform a histogram generation process without difficulty within the invalid period by performing, by the adder 23 independent from the SRAM 22, counting up of the frequency held in the SRAM 22.

Embodiment 4

Figure 11:
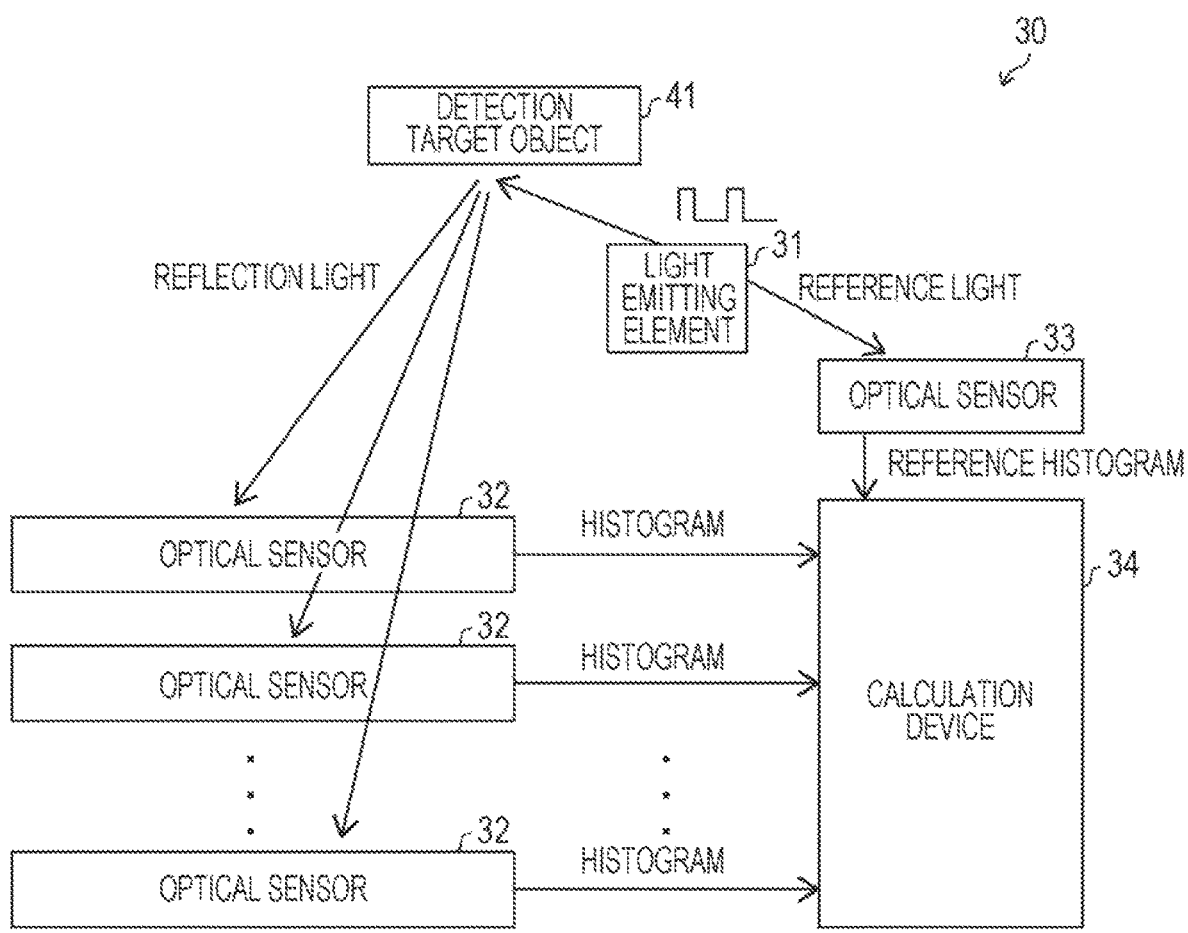
FIG. 11 is a block diagram illustrating a configuration of a distance measurement device according to Embodiment 4.

FIG. 11 is a block diagram illustrating a configuration of a distance measurement device 30 according to Embodiment 4. The distance measurement device 30 includes a light emitting element 31, N (N is an integer equal to or greater than one) optical sensors 32 (first optical sensor), an optical sensor 33 (second optical sensor), and a calculation device 34. A detection target object 41 is present outside the distance measurement device 30. The distance measurement device 30 is a device for measuring a distance from the distance measurement device 30 to the detection target object 41.

The light emitting element 31 emits light at a certain cycle. For example, a light emitting period of the light emitting element 31 is the same as the valid period set in each of the optical sensors 10. Light radiated from the light emitting element 31 travels toward the detection target object 41 and the optical sensor 32.

The N optical sensors 32 has the same configuration as the optical sensor 10 according to any one of Embodiments 1 to 3. Light reflected from the detection target object 41 with respect to the light radiated from the light emitting element 31 is input to each optical sensor 32. Each optical sensor 32 generates a histogram corresponding to a reciprocation time of the input light reflected. The reciprocation time is a time for light reciprocating between the distance measurement device 30 and the detection target object 41. Each light emitting element 31 outputs the generated histogram to the calculation device 34.

The optical sensor 33 has the same configuration as the optical sensor 10 according to any one of Embodiments 1 to 3. The light radiated from the light emitting element 31 is directly input to the optical sensor 33 as reference light. The optical sensor 33 generates the histogram for reference corresponding to a zero-distance based on the input reference light. The zero-distance means that a distance from the distance measurement device 30 to the detection target object 41 is zero. The optical sensor 33 outputs the generated histogram to the calculation device 34.

The calculation device 34 calculates a delay difference between reference light and the light reflected, from the histogram generated by each optical sensor 32 and the histogram for reference generated by the optical sensor 33. Furthermore, the calculation device 34 calculates the distance according to the delay difference as a distance from the distance measurement device 30 to the detection target object 41. For example, the calculation device 34 multiplies the speed of light by the calculated delay difference so that the distance is calculated. In the present embodiment, the speed of light is assumed to be fixed.

In each optical sensor 10 according to any one of Embodiments 1 to 3, it is possible to generate the histogram for measuring the distance at high speed. Since the distance measurement device 30 according to the present embodiment includes the optical sensor 32 and the optical sensor 33 having the same configuration as the optical sensor 10, it is possible to measure the time of flight (TOF) at high speed.

In a case where the distance measurement device 30 includes two or more optical sensors 32, the calculation device 34 calculates a corresponding distance with respect to each of the two or more optical sensors 32. For example, the calculation device 34 calculates the delay difference between the light reflected and input to the optical sensor 32 and light directly input to the optical sensor 33, and calculates the distance according to the delay difference for each optical sensor 32. With this, since the calculation device 34 may calculate the number of distances that is the same as the number of the optical sensors 32 included in the distance measurement device 30, it is possible to increase the accuracy of the distance to be measured.

In the present embodiment, a different optical sensor 32 may receive the light reflected from a different detection target object 41. In this case, the calculation device 34 may individually measure the distance from the distance measurement device 30 to each of the detection target objects 41.

Various electronic apparatuses including the distance measurement device 30 according to the present embodiment are also included in Embodiments of the present disclosure. Examples of such electronic apparatus include a digital camera or the like having an autofocus function.

CONCLUSION

Aspect 1: An optical sensor includes a light receiving unit that generates a pulse synchronous with incidence of a photon, two or more time-to-digital converters that generate a digital value based on the pulse during a valid period with a different phase, which is repeated at an identical cycle, a selection circuit that selects any one of the digital values respectively output from the two or more time-to-digital converters, and a histogram generation circuit that generates a histogram indicating a relationship between a bin number according to the digital value selected by the selection circuit and a frequency by counting up the frequency of the bin number.

Aspect 2: In the optical sensor of aspect 1, each of the two or more time-to-digital converters starts the counting up of the digital value at a time within the valid period, stops the counting up of the digital value when the pulse is input within the valid period, outputs the digital value held to a period outside the valid period, and resets the digital value outside the valid period.

Aspect 3: In the optical sensor of aspect 1, each of the two or more time-to-digital converters performs the counting up of the digital value every time a certain time elapses from inputting of the pulse to the valid period, stops the counting up of the digital value outside the valid period, outputs the digital value outside the valid period after the stopping of the counting up of the digital value, and resets the digital value outside the valid period after the outputting of the digital value.

Aspect 4: In the optical sensor of any one of aspects 1 to 3, the histogram generation circuit includes a memory device that holds the frequency, and an adder that increases the frequency held in the memory device by one.

Aspect 5: A distance measurement device includes a light emitting element that emits light at an identical cycle, at least one first optical sensor that is the optical sensor according to any one of aspects 1 to 4 and receives light reflected from a detection target object with respect to light radiated from the light emitting element, a second optical sensor that is the optical sensor according to any one of aspects 1 to 4 and directly receives the light radiated from the light emitting element as reference light; and a calculation device that calculates a delay difference between the reference light and the light reflected from the detection target object, based on the histogram generated by the first optical sensor and the histogram generated by the second optical, and calculates a distance according to the delay difference.

Aspect 6: In the distance measurement device of aspect 5, the at least one first optical sensor includes two or more first optical sensors, and the calculation device calculates the distance for each of the two or more first optical sensors.

Aspect 7: An electronic apparatus includes the distance measurement device according to aspect 5 or 6.

The present disclosure is not limited to Embodiments described above, and various modifications are possible within the scope of the claims, and embodiments obtained by appropriately combining technical units respectively disclosed in different embodiments are also included in the technical scope of the present disclosure. It is also possible to form new technical features by combining technical units disclosed in each embodiment.

The present disclosure contains subject matter related to that disclosed in Japanese Priority Patent Application JP 2017-207315 filed in the Japan Patent Office on Oct. 26, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical sensor comprising:
a light receiving unit that generates a pulse synchronous with incidence of a photon;
two or more time-to-digital converters that generate a digital value based on the pulse during a valid period with a different phase, which is repeated at an identical cycle;
a selection circuit that selects any one of the digital values respectively output from the two or more time-to-digital converters; and
a histogram generation circuit that generates a histogram indicating a relationship between a bin number according to the digital value selected by the selection circuit and a frequency by counting up the frequency of the bin number, wherein
each of the two or more time-to-digital converters
counts up the digital value at a time within the valid period,
outputs the digital value held until a period outside the valid period at the period outside the valid period, and
resets the digital value at the period outside the valid period,
wherein a first valid period of a first time-to-digital converter corresponds to a period outside a second valid period of a second time-to-digital converter, and
wherein the two or more time-to-digital converters include the first time-to-digital converter and the second time-to-digital converter.

2. The optical sensor according to claim 1, wherein each of the two or more time-to-digital converters
starts counting up the digital value at a time within the valid period,
stops counting up the digital value when the pulse is input within the valid period,
outputs the digital value held to a period outside the valid period, and
resets the digital value outside the valid period.

3. The optical sensor according to claim 1, wherein each of the two or more time-to-digital converters
performs counting up the digital value every time a certain time elapses from inputting of the pulse in the valid period,
stops counting up the digital value outside the valid period,
outputs the digital value outside the valid period after stopping counting up the digital value, and
resets the digital value outside the valid period after outputting the digital value.

4. The optical sensor according to claim 1, wherein the histogram generation circuit includes
a memory device that holds the frequency, and
an adder that increases the frequency held in the memory device by one.

5. A distance measurement device comprising:
a light emitting element that emits light at a cycle;
at least one first optical sensor that is the optical sensor according to claim 1 and receives light reflected from a detection target object with respect to light radiated from the light emitting element;
a second optical sensor that is the optical sensor according to claim 1 and directly receives the light radiated from the light emitting element as reference light; and
a calculation device that calculates a delay difference between the reference light and the light reflected from the detection target object, based on the histogram generated by the first optical sensor and the histogram generated by the second optical sensor, and calculates a distance according to the delay difference.

6. The distance measurement device according to claim 5, wherein
the at least one first optical sensor includes two or more first optical sensors, and
the calculation device calculates the distance for each of the two or more first optical sensors.

7. An electronic apparatus comprising:
a light emitting element that emits light at an identical cycle;
at least one first optical sensor that is the optical sensor according to claim 1 and receives light reflected from a detection target object with respect to light radiated from the light emitting element;
a second optical sensor that is the optical sensor according to claim 1 and directly receives the light radiated from the light emitting element as reference light; and
a calculation device that calculates a delay difference between the reference light and the light reflected from the detection target object, based on the histogram generated by the first optical sensor and the histogram generated by the second optical sensor, and calculates a distance according to the delay difference.

* * * * *